United States Patent
Webster

[15] 3,686,538
[45] Aug. 22, 1972

[54] ELECTRICAL COMPONENT HAVING TERMINAL INSERT SEAL

[72] Inventor: Robert A. Webster, Route 4, Huntsville, Ala. 35803

[22] Filed: Nov. 2, 1971

[21] Appl. No.: 194,979

[52] U.S. Cl. .................... 317/230, 29/570, 174/50.5
[51] Int. Cl. ............................................... H01g 9/10
[58] Field of Search ...... 317/230, 231, 233; 174/50.5

[56] References Cited

UNITED STATES PATENTS

| | | |
|---|---|---|
| 3,356,913 | 12/1967 | Earley ........................ 317/230 |
| 3,341,751 | 9/1967 | Clement ..................... 317/230 |
| 3,307,085 | 2/1967 | Ross ........................... 317/230 |
| 3,174,085 | 3/1965 | Schroeder, Jr. et al. .... 317/230 |

Primary Examiner—James D. Kallam
Attorney—Richard H. Childress et al.

[57] ABSTRACT

A rivet is utilized for both internal and external contact in electronic components, particularly in electrolytic capacitor seals. At least two leads egress from the same opening in the capacitor container and the rivets are recessed within an elastomeric seal member to avoid shorting the lead wires against one another.

14 Claims, 3 Drawing Figures

Patented Aug. 22, 1972

3,686,538

ELECTRICAL COMPONENT HAVING TERMINAL INSERT SEAL

BACKGROUND OF THE INVENTION

Rivets have previously been utilized in seal constructions of electronic components. In electrolytic capacitors, for example, in U.S. Pat. No. 2,225,801 and 3,091,656. An entirely mechanical connection is made between the tabs coming from the capacitor body and the lead wires on the external side of the seal. These mechanical connections are more time consuming and thus more expensive in commerical opperation. Furthermore, this type of seal construction utilize at least two seal members, a relatively rigid member and an elastomeric member for the remaining portion of the seal. Also, in both of these patents the rivets are of special shape and require special shaping and/or forming.

Welded constructions are also known in the art, as can be seen for example from U.S. Pat. No. 3,174,085 and U.S. Pat. No. 3,341,751. In U.S. Pat. No. 3,174,085 a non-rivet shaped member is utilized in FIG. 2 which occupies a considerably portion of the cross-sectional area of the seal. It would be difficult to fit two such members into the opening of the container if a duel lead construction were desired.

In U.S. Pat. No. 3,341,751 two rivet members are welded together within a rigid polymeric member so that a total of three welds are required in the construction shown in FIG. 4. Furthermore, two rivets are required in this construction which increases the cost of this device. Also in these patents the capacitor can is an integral part of the capacitor circuit and a parallel lead construction is not utilized. In. U.S. Pat. No. 3,398,333 specially formed terminal members are required.

It is an object of the present invention to provide an electronic component seal which is simple to construct and inexpensive.

It is another object of the present invention to provide an electrolytic capacitor having a seal construction which is inexpensive to manufacture.

It is another object of the present invention to provide a seal construction with as few parts as possible.

It is another object of the invention to provide a parallel lead construction.

It is another object of the present invention to provide a construction in which the capacitor container can be enclosed with a plastic container and in which the capacitor can need not be part of this circuit.

Other objects will be apparent from the following description and drawings.

SUMMARY OF THE INVENTION

In accordance with the present invention a parallel lead seal construction is provided utilizing a single elastomeric member through which is passed at least two rivets. The upper faces of the rivets are recessed from the upper surface of the elastomeric member. The tabs or leads from the electronic component are welded to the lower portion of the rivet and the external leads are welded to the upper surface of the rivets. If desired the component container may be pinched to aid in sealing the device and crimped to hold the elastomeric member in place.

DETAILED DESCRIPTION

Figure 1:
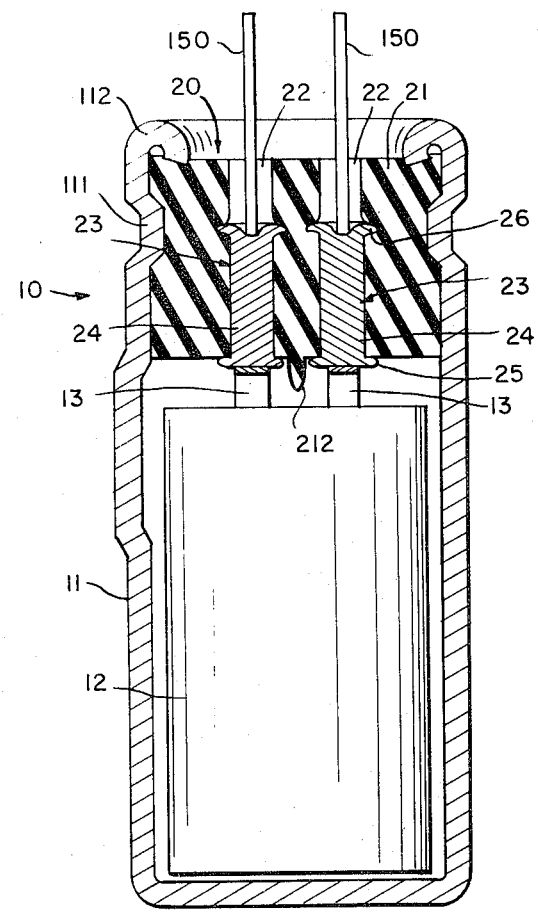
FIG. 1 is a sectional view of the electrical components seals of the present invention.

As can be seen in FIG. 1, an electrical component 10 is shown comprising a container 11 which may be made of metal, metal alloys or plastic. However the preferred material is a thermo plastic material such as polypropelene, polstyrene, polybutylene, polyamide etc. The component also contains a component body 12. The component body may comprise one or more of the following; a capacitor, battery, a resistor, a transistor, or a combination of the foregoing. However, for purposes of illustration the description will be directed to an electrolytic capacitor, with the understanding that one or more of the other components could be utilized instead of, or in addition to such electrolytic capacitors.

Taking a capacitor as an illustration, the body portion 12 will comprise a wound construction of film forming metals, for example aluminum, interspersed with spacers which may be impregnated with an electrolyte that is known in the art. Two or more leads or tabs 13, 14 are attached to the capacitor body for example, by merely interleaving such tabs into the wound construction or by welding to the film forming metal electrodes, and extend out of the component body. In the event that the component body comprises a component, there would still be at least two electrodes extending from the body which should be attached to appropriate portion of the component, ie anode and cathode of a battery, base, emitter and collector of a transistor etc.

The seal 20 comprises an elastomeric member 21 having at least two openings therein 22 for passage therethrough of means for connecting the capacitor body into an electrical circuit. Inset within the opening 22 are at least two rivet members 23.

The rivet members 23 comprise a body portion 24 and an enlarged lower portion 25 which buts up against and engages the lower portion of elastomer member 21. The rivet 23 further comprise and enlarged portion 26 which partially extends into the elastomer 21. The enlarged or flanged portion 26 forms a part of the seal between the atmosphere and the electronic component.

Preferably the flanged portion 26 extends throughout the circumfrence of the openings 22 for effecting the most effective seal.

Figure 2:
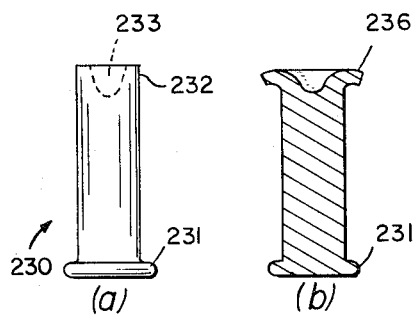
FIG. 2 is a detail of rivets which may be utilized in accordance with the present invention.

Exemplary rivet constructions which may be utilized to form the flanged portion 26 are illustrated in FIG. 2. In FIG. 2(a), a semi-hollow rivet is shown identified as 230 having a lower portion 231 and an upper portion 232 having an opening therein 233. When the rivet is upset the resulting structure is shown in FIG. 2b wherein the upper portion 232 is transformed into the flanged portion 236.

The container 11 is preferably pinched at 111 to aid in maintaining the elastomer seal in place. Similarly the container body may be crimped or a shoulder formed at 112 to further insure proper placement of the seal 20.

In order to assemble the device of the present invention holes 22 are first formed in elastomer member 21. Then rivets 23 of appropriate size are placed within the openings 22 so that lower flanges 25 engage the bottom of the elastomer 21. Next the flanged portions 26 are formed for example, by upsetting the portion 232 shown in FIG. 2 within the elastomer 21. Then welding of tabs 13 to portion 25 of rivet 23 and welding of lead members 150 to the upper portion of flanges 26 is effected. Then the entire assembly including elastomer 21 rivet 23 component body 12 and tabs 13 are inserted into the component housing 11. After this pinch 111 and/or crimps 112 are formed as desired to hold the seal in place.

The elastomer member must be resistant to attack by chemicals such as electrolyte utilized in the component body 12. It must have a certain amount of resiliency to maintain the lead members seperate to avoid shorting. It must also be resistant to attack of any environment with which the device will be subjected to. It should also have sufficient formability so that the flange portion 26 are readily upset thereinto and the pinch portion 111 easily forms thereinto. Finally, it should be inexpensive.

The elastomeric member 21 may be formed of a wide variety of materials including natural and synthetic rubbers for example, polypropylene, ethylene-propylene copolymers, polybutylene, butyrubber may be utilized for the member 21.

The elastomeric member 21 also preferably contains a projection such as 212 in FIG. 1 to reduce the chance of shorting of leads 13 and or rivets 23 shorting against one another at the bottom portion of the seal.

The rivets are made of a conductive metal or alloy which is readily formed or upset to form the flange portion 26. Examples are copper, copper base alloys, aluminum, and aluminum alloys.

Figure 3:
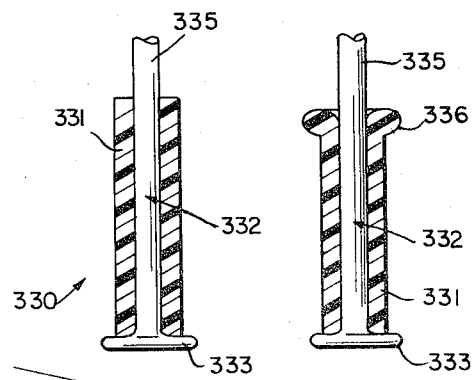
FIG. 3 is a view of a composite rivet which may be utilized in accordance with the present invention.

In the embodiment shown in FIG. 3 a composite rivet is shown. The rivet 330 comprises a plastic jacket 331 surrounding a metal member 332. The jacket is preferably made of a thermo plastic material such as polyamide, polypropylene, polystyrene, condensation resins include phenolis, such as bakelite. The metal member 232 comprises a lower flange portion 233 and an upper stem potion 235, and may be made of any of the above rivet materials.

In utilizing the embodiment of FIG. 3, the composite rivet is inserted into the holes 22 in elastomeric member 21 so that lower flange portion 333 abuts against the bottom of the elastomer, preferably in the softened state. Then a cylindrical tool is inserted which shapes or upsets the upper portion of jacket 331 within elastomeric member 21 to form an upper sealing flange 336 similar to flange 26. Tabs 13 are then welded to flange 333 and external leads are welded to stems 335.

What is claimed is:

1. An electrical component seal comprising:
   an electrical component container having an opening therein;
   a component body placed therein, said component body having at least two component lead members extending therefrom;
   a seal member within said opening comprising an elastomeric member;
   said elastomeric member having at least two openings therein;
   rivet members within said openings in said elastomer having a lower flange portion which engages the bottom of said elastomeric members, and an upper flange portion which is recessed from the upper surface of said elastomer, said flange members extending into said elastomeric material to provide in conjunction with said elastomeric members a sealing of said component body from the atmosphere;
   said component leads being welded to the lower portion of said lower flange member to provide electrical connection of said component body and an external circuit; and
   at least two external leads welded to the upper portion of said rivet.

2. An electrical component according to claim 1 wherein means are provided for avoiding shorting of said rivets at the bottom portion of said elastomeric member.

3. An electrical component according to claim 1 wherein said rivet is a composite rivet.

4. An electrical component according to claim 1 wherein said flanged portion is formed from a semi-hollow rivet.

5. An electrical component according to claim 1 wherein said component body is a capacitor body.

6. An electrical component according to claim 1 wherein said component body is a battery.

7. An electrical component according to claim 1 wherein said component body is a transistor.

8. An electrical component according to claim 1 wherein said component body is a resistor.

9. An electrical component according to claim 1 wherein said elastomeric is selected from natural and synthetich rubber materials.

10. An electrical component according to claim 1 wherein said rivets are made from material selected from the group consisting of copper, copper base alloys, aluminum, and aluminum alloys.

11. An electrical component according to claim 3 wherein said rivets are made from metal and thermo plastic material.

12. An electrical component according to claim 11 wherein said thermo plastic material is upset to form said flange member.

13. An electrical component according to claim 10 wherein said metal is upset to form said flange member.

14. An electrical component according to claim 13 wherein lead members are welded to the upper metal flange member.

* * * * *